Figure 1:
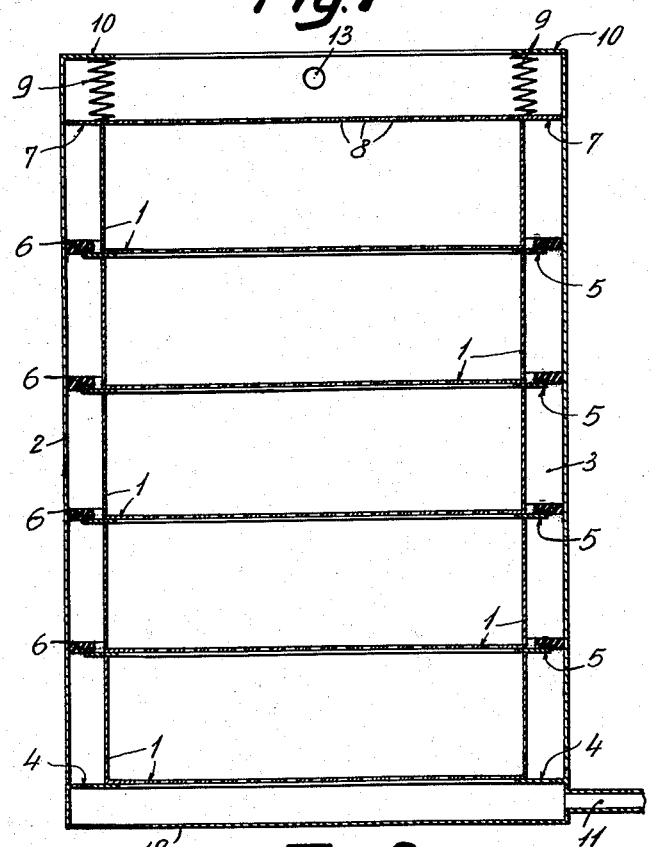

Nov. 4, 1952  E. A. H. KJORSTAD  2,616,811
REFRIGERATION OF FISH
Filed June 4, 1947

Patented Nov. 4, 1952

2,616,811

UNITED STATES PATENT OFFICE 2,616,811

REFRIGERATION OF FISH

Erik Arnfinn Hallgrim Kjorstad, Oslo, Norway

Application June 4, 1947, Serial No. 752,306

2 Claims. (Cl. 99—195)

The present invention relates to a process for refrigerating fish, and more particularly to a process for quickly refrigerating fresh fish so as to preserve the qualities thereof.

It is an object of the present invention to provide a process for refrigerating fish (with or without head and viscera), on board boat or after being taken ashore.

The process of the present invention is quite simple as compared to the hitherto known processes and provides extremely important advantages to the fish industry in that the process of the present invention preserves the fish better than the known processes and also keeps the nutrient value of the fish very high.

The present process is based on the use of concentrated sea water, or a similar salt solution, as a refrigerating agent in order to be able to obtain a freezing point of —5° C. or less. The solution cooled at about this temperature is brought to contact with the fish in suitable cases or containers in such manner that the inner temperature of the fish reaches the threshold at which congelation begins, this threshold being different for different kinds of fish depending on size, weight and particularly on the fat content of the fish.

The time of action of the refrigerating liquid is dependent on the difference in the inlet and outlet temperatures in the containers and it may simply and practically be determined beforehand, by experience, for different kinds of fish.

The rapid refrigeration, which is herein called "quick sub-chilling" has as a major object thereof the acceleration of rigor mortis so as to give to the fish a maximum solidity which is maintained as long as an adequately low temperature is maintained.

The thus treated fish may be cut into pieces, i. e. filets, without the fish being torn, squashed or crumbled, similarly to quick frozen foods. After being cooked and even after sterilization, the flesh of the thus treated fish remains firm, homogeneous and cannot easily be torn from the fish by a fork so that it is necessary to use a knife when eating such treated fish.

Despite the above effects, the quick sub-chilling process of the present invention preserves the palatability and flavor of the fish and even the color of the outside of the fish. Even the gills maintain their coloration. The blood of the fish remains fresh and red in the blood vessels without collecting near the spine.

By application ashore the present process may give good results by treating the fish immediately after being landed and particularly good results are obtained for fish which are caught the same day that they are brought ashore i. e. herring, mackerel etc. The present process cannot of course give to fish which are caught and kept on ice in the hold of the trawler before being brought ashore the original freshness of the fish, but the process can stop the phenomena following rigor mortis in retarding the phenomenon of syneresis in the inner muscular fibers of the fish and by stopping the oxidation of the fat and the vegetative and fermentation activity of the bacteria. The quick sub-chilling process of the present invention thus stabilizes the fish in the state in which they were after being removed from the ice on the boat and therefore the preservation of the fish is prolonged for several days.

In refrigerating fish it has been noticed that upon freezing an equilibrium temperature between the fish and the freezing medium, at which temperature the fish starts to freeze, is reached, similarly to the case of ice and water. This equilibrium temperature varies with different species of fish and is only about 1° C. higher than the freezing temperature of ordinary sea water, which is the natural habitation of the fish. This difference in freezing temperature of sea water and fish is too little for the industrial use of sea water as a refrigerating medium.

According to the present invention, quick sub-chilling is accomplished in a simple modified manner by the use as a refrigerating agent of concentrated sea water or similar salt solution the temperature of which can be lowered an additional 4° C., as compared to ordinary sea water. This concentrated sea water which can be lowered an additional 4° C. or more without freezing thereof is used for the freezing of the fish according to the present invention, the refrigeration of the fish being stopped when the temperature has reached the equilibrium temperature in the freezing of the fish, without the fish being frozen. It is due to the existence of this critical point in the freezing of fish, that the process of the present invention can be carried out at the low temperature used without freezing of the fish, even when taking into consideration the unavoidable variations of industrial practice. The end of the refrigeration is determined by experience as to the temperature of the liquid used, the quantity and temperature of the liquid upon entering the container being predetermined. It is also possible to base the end of the operation on the time of immersion of the fish.

In order to avoid the formation of impenetrable or only slightly penetrable clumps by the refrigerating liquid, the fish is placed in containers into which is placed beforehand some crushed ice, and care is taken not to completely fill the containers with fish. In this way the fish will float free in the current of the refrigerating liquid and the fish will be disjoined from each other by the ice particles which slip in between the fish on account of the lower specific density of the ice. Furthermore, during the operation, the crushed ice melts giving its frigories to the liquid, thus maintaining the low temperature thereof and preventing the liquid from having any other action on the fish than that of refrigeration.

Application on board ship

The fish, as soon as caught, and possibly after first having removed the head and viscera, is placed in suitable containers provided with an upper opening and having an outlet at the bottom of the fish. At the bottom of the container is placed some crushed ice and fish is placed into the container, taking care not to completely fill the container with the fish. The refrigerating liquid passes preferably downward through the container in predetermined quantity, speed and temperature. The operation is rapidly and efficiently ended at a time determined beforehand from experience. The liquid is then removed from the container and the fish taken out through the outlet at the bottom of the container. A little sea water applied to the fish removes the refrigerating liquid adhering thereto and the fish may be stacked in the hold with a little ice to prevent oxidation and dehydration, the stacking of ice being similar to the known processes. To keep the fish fresh in this state for two or three weeks, or even more, if necessary, the temperature in the hold is maintained at the same temperature as the fish at the end of the treatment.

Application ashore

The fish, i. e. sardines, mackerel, herring etc. freshly landed are placed as soon as possible in open cases filled with fish and ice as described above. The cases are placed one above the other in containers, any other arrangement being possible; the refrigerating liquid preferably enters at the upper part of the container in predetermined speed, quantity and temperature and is passed successively through all of the cases before being returned to the generator and again recirculated. Having predetermined by experience the necessary time of action, the treatment is stopped exactly at the right moment, and the cases taken out of the container.

In order to prevent the liquid from passing between the cases and the container, frames are placed between the cases so as to form watertight connections and divide the space between the cases and the container into many parts.

After treatment, the fish are preferably kept in the same cases. They are washed to remove adhering refrigerating liquid and then covered with a layer of ice to prevent oxidation and dehydration. A lid is generally placed on the cases.

In this state the fish retain their full freshness and flavor for two or three weeks and sometimes more if care is taken to keep the fish at the same temperature as at the end of the treatment. These cases may be sent by railway in isothermic cars for a trip taking many days, the fish reaching the markets completely fresh.

Figure 2:
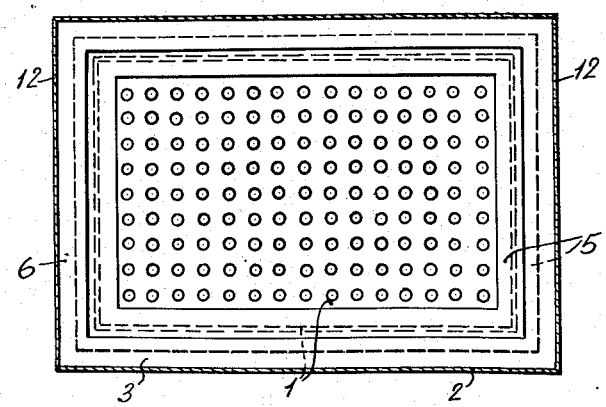

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic elevational view of an arrangement according to the present invention; and Fig. 2 is a sectional plan view of Fig. 1.

The fish to be treated are loaded in cases 1 whose dimensions are for example sufficient to contain about 50 kg. of fish for each case having a height of about 25 cm. These cases are disposed in container 2, whose horizontal dimensions are longer than cases 1 so that a free space 3 remains between case 1 and container 2. The first case 1 is placed on a collar 4 inside and near the bottom 12 of the container 2. On first case 1 is placed frame 5 whose center opening is smaller than case 1 and provided with a wire work in order to prevent the fish from floating too high. The outer boards in the frame 5 have a rubber trimming 6 which is tight against the inner walls of the container 2. On this frame is placed another case 1, another frame, etc. The total height of the container 2 is in general arranged for five or six cases 1. On the upper case 1 is placed a frame 7 with a wire work 8 to prevent the fish from leaving the upper case 1. The springs 9 fastened to collars 10 on the container 2 keeps the frame 7 against the upper case 1 and consequently all the cases 1 and frame 5 are kept in place on the bottom collar 4.

The liquid may enter the container 2 by inlet 11 under the collar 4 and in such case it will pass through all the cases 1 and leave the container by the outlet 13 above the frame 7. Or, the liquid may enter by inlet 13 and pass downward through the container and leave the same by outlet 11.

It may be noted that the liquid cannot run into the space 3 because the pressure of the springs 9 assure sealing between the cases 1 and the frame 5. If the liquid does come into the space 3, there will be no short circuit, this space being divided into tight compartments by the frame 5 and their rubber joints 6.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The process of preparing salt water fish comprising in combination the steps of placing said salt water fish in a fluid concentrated salt solution cooled to a temperature of about −5° C.; cooling said salt water fish in said fluid concentrated salt solution so that the temperature of said salt water fish is reduced to its freezing temperature of about −1° C.; and terminating said cooling of said salt water fish at said freezing temperature when congelation of said fish starts.

2. The process of preparing salt water fish comprising in combination the steps of placing said salt water fish in a fluid concentrated salt solution cooled to a temperature not exceeding −5° C.; cooling said salt water fish in said fluid concentrated salt solution so that the temperature of said salt water fish is reduced to a temperature which is about 1° C. higher than the freezing temperature of ordinary sea water; and terminating said cooling of said salt water fish at said freezing temperature when congelation of said fish starts.

ERIK ARNFINN HALLGRIM KJORSTAD.

REFERENCES CITED

The following references are of record in the file of this patent:

UNITED STATES PATENTS

| Number | Name | Date |
| --- | --- | --- |
| 1,177,308 | Dahl | Mar. 28, 1916 |
| 1,367,024 | Dahl | Feb. 1, 1921 |
| 1,511,824 | Birdseye | Oct. 14, 1924 |
| 1,912,896 | Hiller | June 6, 1933 |
| 1,940,159 | Alsberg | Dec. 19, 1933 |
| 2,196,643 | Reeh | Apr. 9, 1940 |

OTHER REFERENCES

"The Freezing Preservation of Foods" by Tressler and Evers, 1947 ed., page 573. The Avi Publishing Co., Inc., N. Y., publishers.